(12) United States Patent
Klein et al.

(10) Patent No.: US 6,596,361 B2
(45) Date of Patent: Jul. 22, 2003

(54) LENTICULAR LABEL MANUFACTURE

(75) Inventors: Donald P. Klein, Dell Rapids, SD (US); Brian J. Baumgart, Sioux Falls, SD (US)

(73) Assignee: CCL Label, Inc., Monrovia, CA (US)

( * ) Notice: Subject to any disclaimer, the term of this patent is extended or adjusted under 35 U.S.C. 154(b) by 33 days.

(21) Appl. No.: 09/800,868

(22) Filed: Mar. 7, 2001

(65) Prior Publication Data

US 2002/0124943 A1 Sep. 12, 2002

(51) Int. Cl.[7] ................................................. G09F 3/10
(52) U.S. Cl. .......................... 428/42.3; 283/72; 283/81; 428/40.1; 428/41.7; 428/41.8; 428/42.1; 428/42.2; 428/43; 428/156; 428/168
(58) Field of Search ................................ 428/40.1, 41.7, 428/41.8, 42.1, 42.2, 42.3, 43, 156, 168; 283/72, 81; 40/454

(56) References Cited

U.S. PATENT DOCUMENTS

| 5,216,543 A | 6/1993 | Calhoun |
| 5,301,981 A * | 4/1994 | Nesis ........................... 283/73 |
| 5,361,164 A | 11/1994 | Steliga |
| 5,457,515 A * | 10/1995 | Quadracci et al. .......... 355/132 |
| 5,494,445 A | 2/1996 | Sekiguchi et al. |
| 5,967,032 A | 10/1999 | Bravenec et al. |
| 5,974,967 A | 11/1999 | Bravenec et al. |
| 6,010,764 A | 1/2000 | Abrams |
| 6,065,623 A | 5/2000 | Hierzer et al. |
| 6,258,194 B1 * | 7/2001 | Danon ........................... 355/22 |

FOREIGN PATENT DOCUMENTS

JP  11-101950  * 4/1999

* cited by examiner

*Primary Examiner*—Nasser Ahmad
(74) *Attorney, Agent, or Firm*—Warner Norcross & Judd LLP

(57) ABSTRACT

A process for forming lenticular labels on a continuous web so that the lenticules are perpendicular to the longitudinal axis of the web. The process includes the steps of: advancing a continuous web of label stock including an adhesive on both sides; providing multiple sheets of lenticular assemblies; and securing the sheets of lenticular assemblies to one side of the continuous web with that lenticules of the lenticular assemblies oriented perpendicularly to the length of the continuous web.

9 Claims, 6 Drawing Sheets

LENTICULAR LABEL MANUFACTURE

BACKGROUND

The present invention relates to labels and more particularly to the manufacture of labels including lenticular lenses.

Lenticular lenses are known and used in the printing of advertising and promotional materials, packaging labels, hang tags for merchandise, product tags, and security labels. Lenticular lenses are thin, transparent lenses that are flat on one side and include a plurality of parallel, linear, side-by-side lenticules—elongate, convex lenses—on a second side. Typically, an image is printed on the flat side to create a visual effect of zoom-in, zoom-out, steroscoping, three-dimensional sequencing, or movement of the image when viewed through the lenticules. The combination of a lens and an image is referred to as a lenticular assembly.

Lenticular assemblies are manufactured in a continuous web with the lenticules being parallel to the longitudinal axis of the continuous web. In one manufacturing process, concave machine guides fit over the convex lenticules as the web advances to ensure exact registration between images printed on the flat side and the lenticules.

In a popular application, the web of lenticular assemblies is applied to a web of transfer tape on a release liner or carrier web. The adhered lenticular assemblies and tape are die cut to create a continuous web of pressure sensitive lenticular labels. The resultant product is a continuous web of lenticular labels having the lenticules oriented parallel to one another and the length or the longitudinal axis of the web.

The resulting web of lenticular labels suffers a number of shortcomings. Most significantly, the orientation of the lenticules extending the length of the label web governs the orientation of the desired visual effect. Specifically, as a result of the lenticules' orientation, the intended visual effect on the continuous label web may be viewed in only two ways; (1) by rotating the continuous web along an axis parallel to the length of the web, and (2) by moving the web so that a viewer's sight line moves across the width of the web, that is, perpendicular to the length of the web.

When labels are applied from the resulting web to objects, such as bottles, using conventional labeling equipment, the lenticules are oriented circumferentially on the object (i.e. perpendicular to the height of the object). Consequently, the visual effect occurs only when the viewer and the labeled object move vertically relative to one another. Because continuous lenticular assemblies are available only with lenticules parallel to the direction of travel, the conditions under which the visual effects occur have been limited.

SUMMARY OF THE INVENTION

The aforementioned problems are overcome in the present invention wherein the lenticules of lenticular labels on a continuous web are oriented transversely to the longitudinal axis of the web.

The process of manufacturing the web includes the steps of: providing a continuous web of label stock with adhesive on both sides, placing sheets of lenticular assemblies on one side of the continuous web with the lenticules of the lenticular assemblies transverse to the length of the continuous web; and optionally die-cutting the lenticular assembly/label stock to form individual labels.

When the lenticular labels are applied with conventional continuous labeling equipment to a vertically standing article, for example, a bottle, the desired visual effect is perceived by a viewer either (1) as the article is rotated about its longitudinal axis or (2) as the viewer walks past the vertically standing article.

These and other objects, advantages and features of the invention will be more readily understood and appreciated by reference to the detailed description of the preferred embodiments and the drawings.

DETAILED DESCRIPTION OF THE PREFERRED EMBODIMENTS

Figure 1:
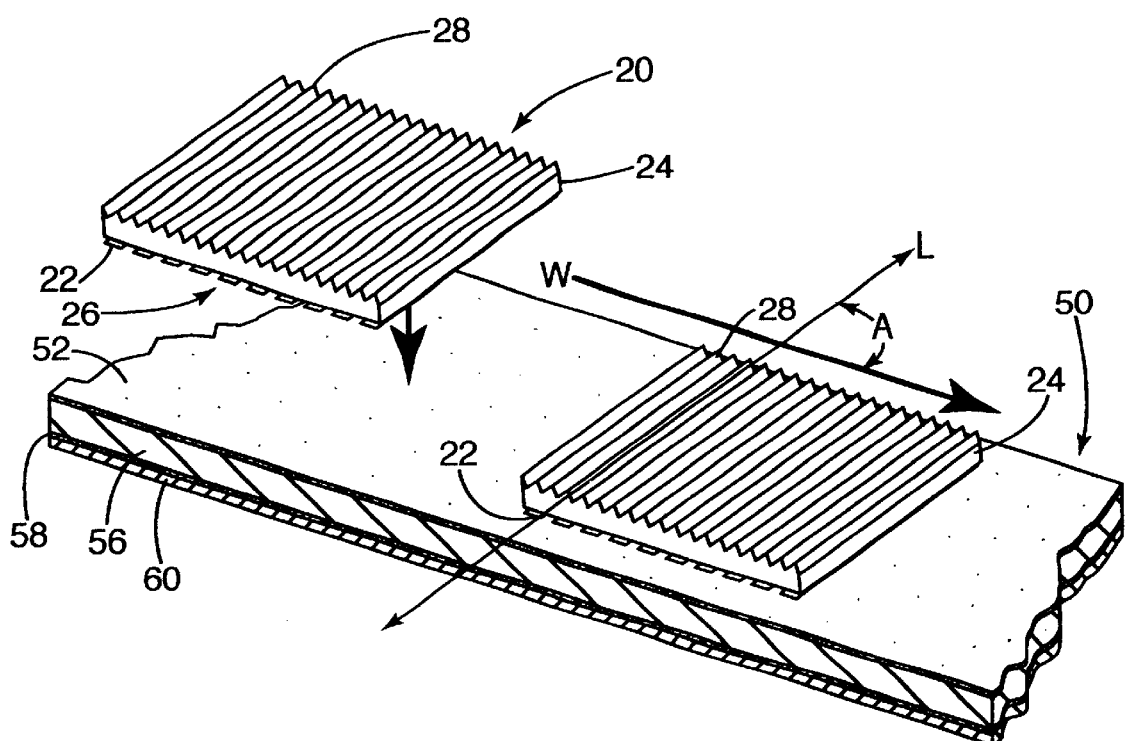
FIG. 1 is a perspective view of the continuous lenticular label web manufacturing process of the present invention.
Figure 2:
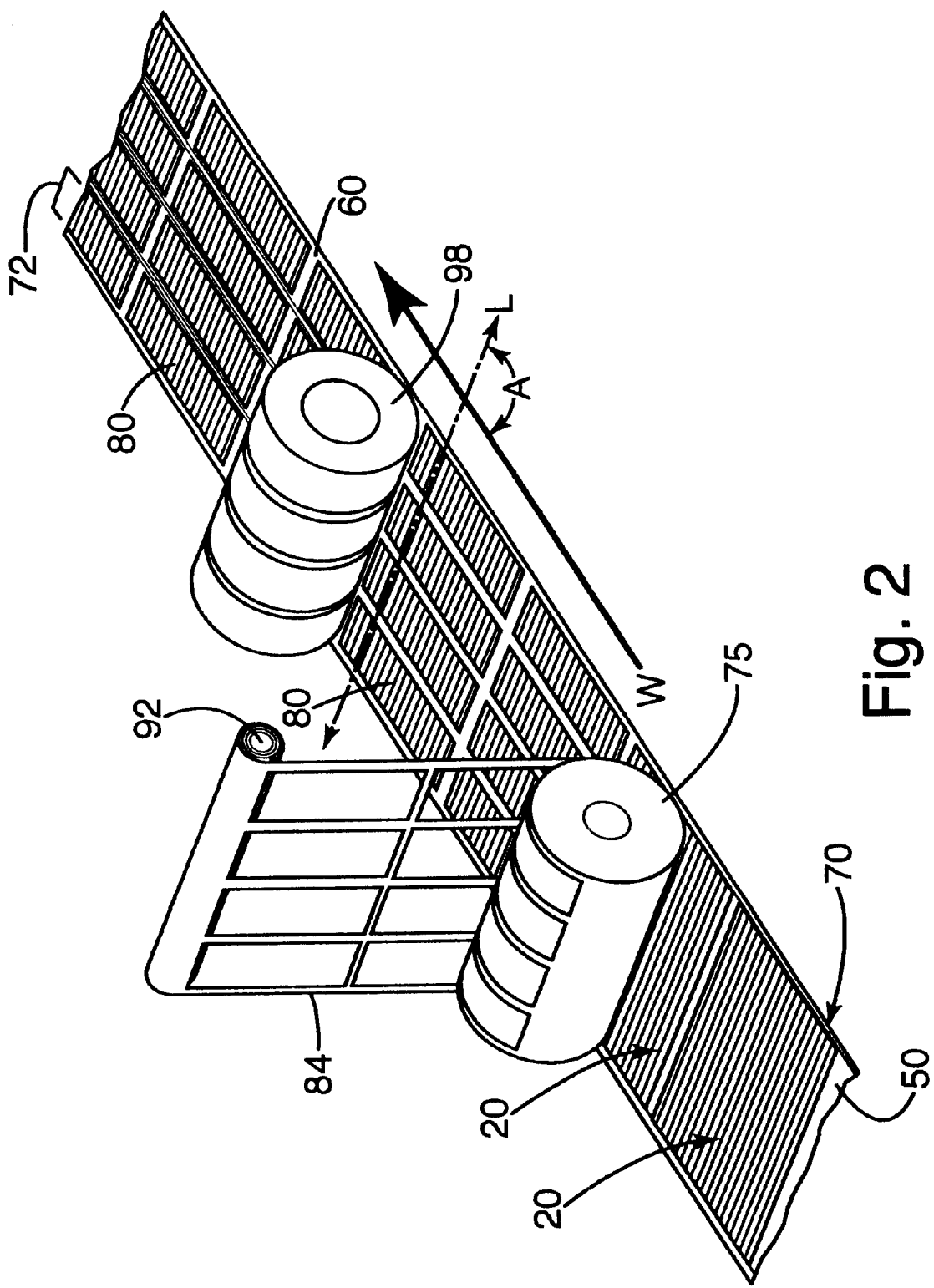
FIG. 2 is a perspective view of the continuous lenticular label web manufacturing process with individual lenticular labels being formed.

In the preferred embodiment, the present invention is described in connection with the manufacture of a continuous lenticular label web and the application of individual labels to articles. With reference to FIGS. 1 and 2, the lenticular label web 10 of the preferred embodiment is constructed from sheets of lenticular assemblies 20 secured to a label assembly 50, which is in the form of a continuous web.

The lenticular assembly 20 includes a lenticular lens 24 associated with a visual effect image 22 to provide an illusion. As desired, a plurality of images 22 may be associated in any configuration on the lenticular assembly 20. The visual effect image 22 may include any combination of graphics, text, or other visual information. As used herein, "visual effect image" means an image that creates illusions such as "flips", "3-D" or stereographic, full motion video, "morphing", and zooming. A "flip" represents an abrupt change from one viewed image to another, different image "3-D" effects produce an illusion of depth for an object being viewed. Full motion video produces a sense of movement of an object being viewed as the viewing angle changes. "Morphing" produces an illusion of a metamorphosis (transition) from one image to another as the viewing angle changes. Zooming presents a size change in an object being viewed, the object appearing to move either closer to, or away from, the viewer.

The lenticular assembly 20 may be of various constructions, including the preferred construction depicted in FIG. 1, where lenticular lens 24 has an image printed on the flat side 26, opposite the lenticules 28. The image may be printed on the flat side 26 using conventional lenticular lens printing methods, which, as will be appreciated, require precise registration of the images 22 with respect to the lenticules 28 to ensure the image is viewed through the lenticular lens with the intended visual effect.

Figure 6:
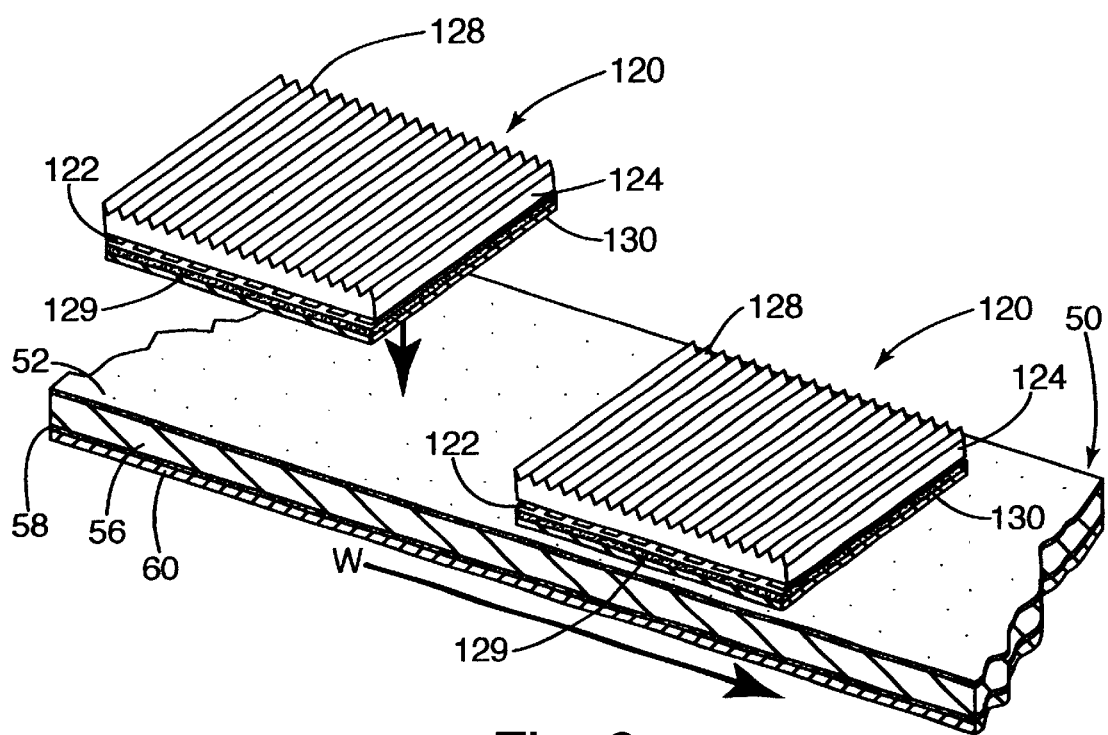
FIG. 6 is a perspective view of an alternative construction of a lenticular assembly of the continuous lenticular label web.

In an alternative construction, depicted in FIG. 6, the lenticular assembly 120 includes a lenticular lens 124 secured with a conventional, permanent adhesive 129 to lenticular stock 130 on the flat side 126 of the lenticular lens 124, opposite the lenticules. The lenticular stock 130 has an image 122 printed thereon that is precisely aligned with the lenticules 28 in a conventional manner to provide the intended viewing effect. The lenticular stock 130 may be of any material or combination of materials including, but not limited to paper, plastic, or metal foil.

In the preferred embodiment, depicted in FIGS. 1 and 2, the lenticular assemblies 20 are provided in sheet form. The lenticular assemblies 20 are secured to the continuous web of label assemblies 50 so that the direction L in which the lenticules extend in parallel is offset some angle A from the direction W coincident with the length of the continuous web, also known as the direction/line of advancement, or the direction/line of travel of the web. The lenticular assemblies 20 may be secured to the continuous web of label assemblies 50 with any suitable adhesive, but preferably with permanent adhesive 52.

The label assembly 50 is preferably in continuous web form, as depicted in FIGS. 1–6. Label assembly 50 includes label stock web 56, which may be constructed of any suitable material or combination of materials including, but not limited to paper, plastic, or metal foil. On a first side of the stock 56, an adhesive 52 is disposed to secure sheets of lenticular assemblies 20 to the label assembly 50. Preferably the adhesive is a conventional permanent adhesive, but other adhesives may be used as the application requires. On the opposite side of the stock 56, a second adhesive 58 is disposed. Adhesive 58 is preferably a pressure sensitive adhesive, but also may be any conventional adhesive as the application requires.

Adhesive 58 secures sock 56, and ultimately the web of label assembly material 50 to liner 60, which is preferably a silicone coated release liner, but may be any suitable carrier liner.

Method of Manufacture

With reference to FIGS. 1–4, there will now be described the preferred process of the present invention of manufacturing a continuous lenticular label web. Individual labels from the continuous web manufactured by the preferred process are preferably applied using conventional labeling equipment to vertically standing articles.

The preferred process generally includes the steps: providing multiple sheets of lenticular assemblies; providing a continuous web of label stock including a first side with a pressure sensitive adhesive disposed thereon and a second side with a permanent adhesive disposed thereon; and securing the sheets of lenticular assemblies to the continuous web with the permanent adhesive so that lenticules of the lenticular assemblies extend in a direction that is offset a pre-selected angle from a direction coincident with the length of the continuous web.

As depicted in FIGS. 1 and 2, the lenticular assemblies 20 are provided in sheet form. With conventional equipment, the sheets are positioned on the permanent adhesive 52 to secure the sheets of the lenticular assemblies 20 to the label assembly web 50. When the sheets are adhered to the web 50, the lenticules 28 of the sheets of lenticular assemblies 20 extend in direction L which is non-coincident with and at some angle A from direction W. Angle A is between about 0 and 180 degrees, preferably, between about 45 and 135 degrees, more preferably, about 80 to about 110 degrees, and most preferably, about 90 degrees. At about 90 degrees (depicted in FIGS. 1 and 2), the direction in which the lenticules extend L is substantially perpendicular to direction W. The sheets of the lenticular assemblies 20, depicted in the figures as rectangular, may be of any shape or size and may include any number of visual effect images to form individual lenticular labels.

When the sheets of lenticular assemblies 20 are successfully adhered to the label assembly web 50, the resultant combination is a lenticular label assembly web 70. The web 70 is advanced to a conventional cutting station 75 where individual lenticular labels 80 are cut. The cutting station may implement any conventional cutting method to cut the web, such as roller die-cut (as depicted) or laser cut methods. The web may also be cut into labels in any conventional manner, for example by butt-cutting the labels, where no skeleton waste from excess material is created, or by skeleton cutting the labels, where such waste is created. If skeleton cutting methods are used, the waste matrix 84 generated may be removed from the web 70 and rolled on collector 92 (FIG. 2).

Notably, the individual lenticular labels 80 created remain on the release liner 60. The lenticules 28 of the individual labels 80 remain oriented and extending in the same direction L as when the lenticular assemblies were first positioned on the label assembly web. Accordingly, in the preferred process, all the labels 80 on the web have lenticules extending in direction L, which is about perpendicular to direction W.

Additionally, it is preferred to cut the lenticular label web into sub-webs 72 that include single rows of lenticular labels 80 on the release liner 60. This is so the labels from the sub-webs 72 can easily be applied on individual articles one at a time. The sub-web cutting may be performed in any conventional manner. As depicted in FIG. 2, roller die-cutter 98 cuts the sub-webs 72.

Figure 3:
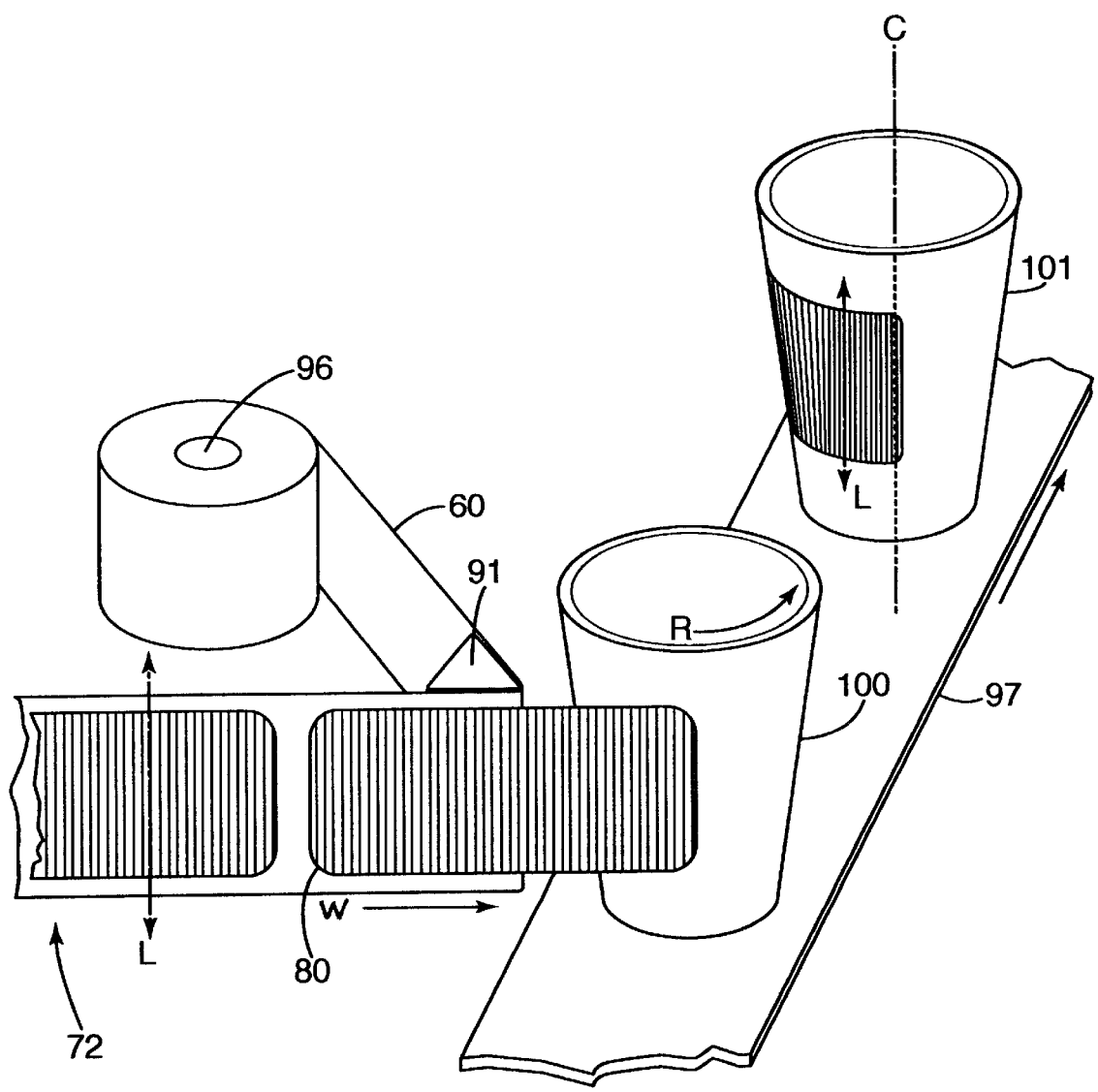
FIG. 3 is a perspective view of individual lenticular labels being applied from a web onto articles using conventional equipment.
Figure 4:
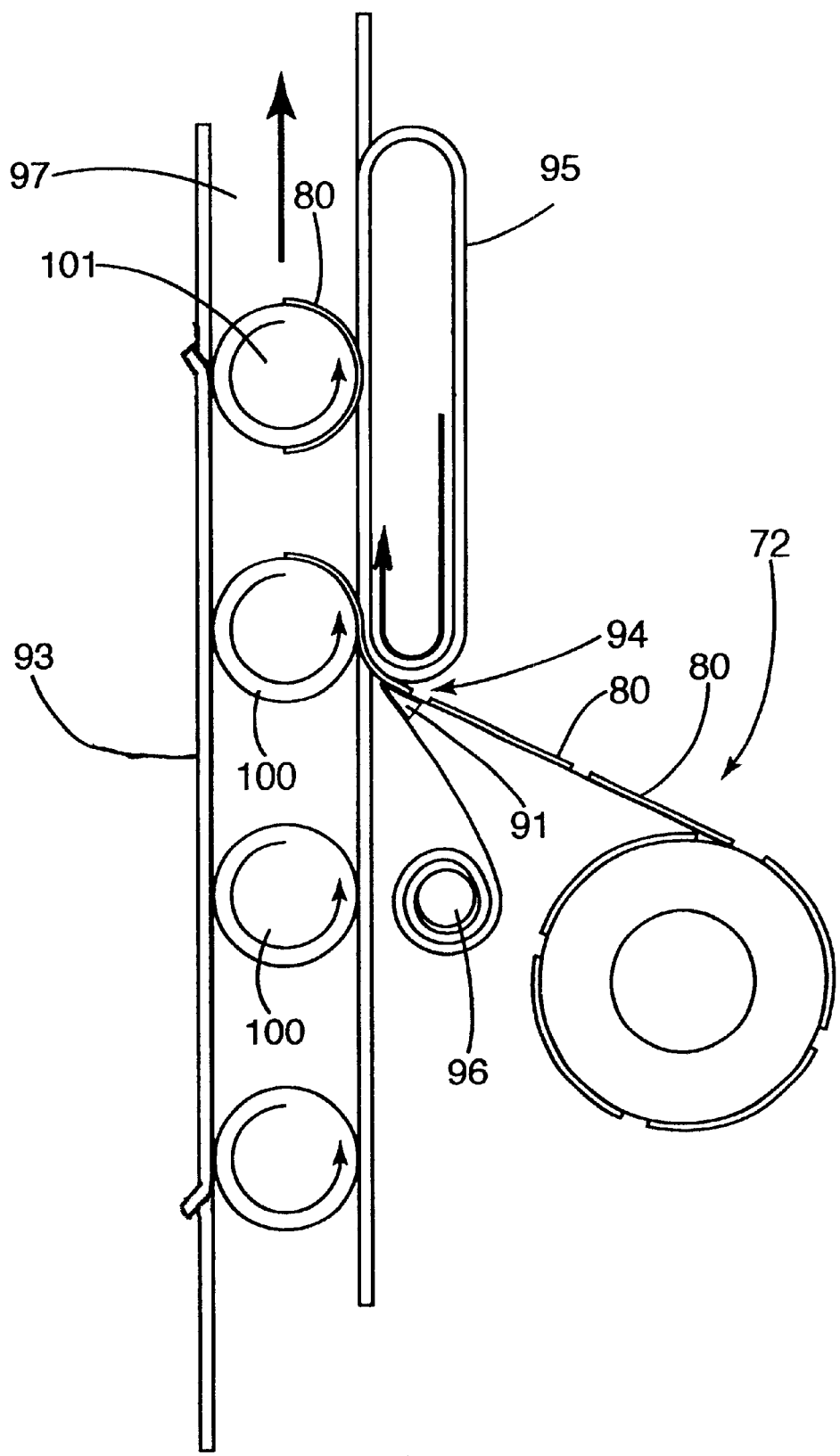
FIG. 4 is a top plan view of individual lenticular labels being applied from a web onto articles using conventional equipment.

In another step, the individual labels 80 are applied to articles 100 using the conventional continuous labeling equipment as depicted in FIGS. 3 and 4. As depicted, the lenticular label sub-web 72 includes only one row of labels 80. The labels 80 are positioned at application station 94 immediately adjacent the article, here depicted as a cylindrical container 100. Without rotating the label 80 to change the lenticule orientation L, the article 100 is rotated adjacent the label 80 with belts 95 and 97 and plate 93 as depicted. The label 80, is peeled off the sub-web 72 with peel knife 91. By way of the pressure sensitive adhesive thereon, the label 80 catches and adheres onto and around the article 100. As the article rotates, the label 80 is peeled off liner 60 and wraps onto the article 100. The liner 60 is guided away from the application station 94 and collected by liner guide 96. The labeled article 101 is conveyed away from the application station 94 by conveyor 97 and another article is labeled.

Figure 5:
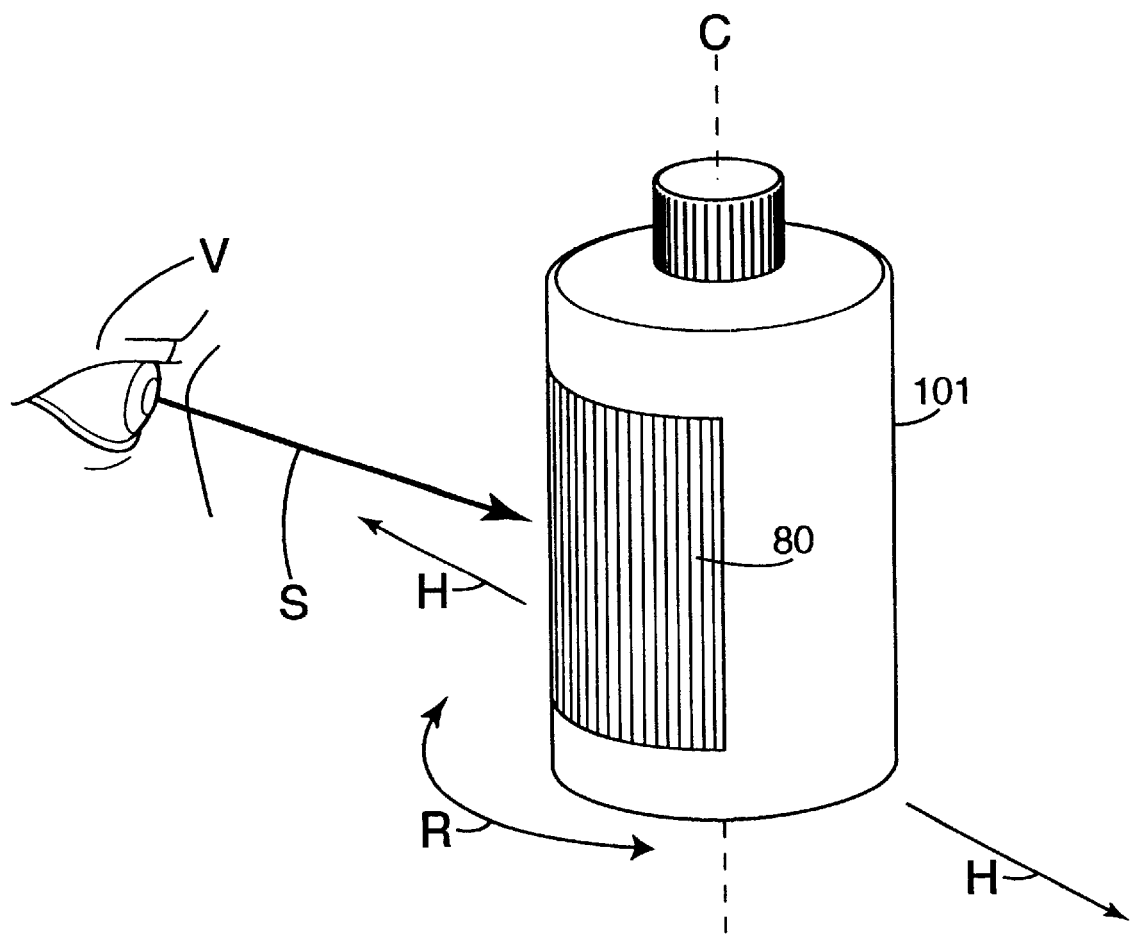
FIG. 5 is perspective view of a viewer perceiving a lenticular label manufactured according to the process of the present invention and applied using conventional equipment.

With reference to FIGS. 3 and 5, the label 80 applied to the article 100 according to the preferred process is consequently oriented so the lenticules extend in parallel in direction L, which is substantially parallel with the longitudinal axis C of the cylindrical article 101. As depicted in FIG. 5, with the orientation of the lenticules L parallel with the longitudinal axis C, the intended visual effect image is viewable by a viewer V when the article 101 is rotationally translated or horizontally translated. Rotationally translated means rotated about the longitudinal axis C of the article 101 in direction R as depicted in FIG. 5. Translated horizontally means moved across the viewer's line of sight S in direction H as depicted in FIG. 5. Of course, horizontal translation may occur when the article 101 itself is moved by a viewer, or when a viewer walks past an article, for example, when a viewer walks past an article displayed on a shelf.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A continuous web of lenticular labels comprising:

a release liner;

label stock including a first side adhered to the release liner, a second side, and a longitudinal axis;

a first lenticular assembly including first lenticules adhered to the second side, said first lenticules transverse to the longitudinal axis, said first lenticular assembly and said label stock forming a first lenticular label; and a second lenticular assembly including second lenticules adhered to the second side, said second lenticules transverse to the longitudinal axis, said second lenticular assembly and said label stock forming a second lenticular label, said first and second lenticular assemblies disposed on the label stock so that the first lenticules and the second lenticules are substantially parallel to one another.

2. The continuous web of lenticular labels of claim 1, wherein the release liner is secured to the label stock with a pressure sensitive adhesive.

3. The continuous web of lenticular labels of claim 1, wherein the lenticules are perpendicular to the longitudinal axis.

4. The continuous web of lenticular labels of claim 1, wherein the first and second lenticular assemblies each include a visual image effect printed thereon, and wherein each visual image effect is perceived by an operator when the operator views the first and second lenticular assemblies along a plane substantially parallel to the longitudinal axis.

5. A continuous web of lenticular labels comprising:

a continuous release liner including a longitudinal axis;

a plurality of lenticular labels, each including a base and lenticules adhered to said base, the bases of said plurality of lenticular labels adhered to said release liner wherein said lenticules are substantially transverse to said longitudinal axis and substantially parallel to one another.

6. The continuous web of lenticular labels of claim 5 wherein said second adhesive is a pressure sensitive adhesive and the plurality of lenticular labels are oriented on the release liner in side-by-side relation.

7. The continuous web of lenticular labels of claim 6 wherein said lenticules are perpendicular to said longitudinal axis.

8. The continuous web of lenticular labels of claim 5 wherein said lenticules are offset from said longitudinal axis by an angel between about 85 and about 105 degrees.

9. A container label system comprising:

a container including a container longitudinal axis;

a base label including a first side and a second side, said first side having an adhesive thereon that adheres said base label to said container and a second adhesive on said second side; and a lenticular assembly secured to said second side with said second adhesive, said lenticular assembly including a plurality of lenticules, a plurality of images printed in alignment with said lenticules to form a visual effect image, said plurality of lenticules oriented substantially parallel with said container longitudinal axis, wherein the visual effect image is perceived by a viewer when the container is rotated about the container longitudinal axis.

* * * * *

Disclaimer 6,596,361—Donald P. Klein, Dell Rapids, SD; Brian J. Baumgart, Sioux Falls, SD. LENTICULAR LABEL MANUFACTURE. Patent dated July 22, 2003. Disclaimer filed March 8, 2004 by the attorney.

Hereby enter this disclaimer to claim 9 of said patent.

*(Official Gazette, June 15, 2004)*